(12) United States Patent
Wang et al.

(10) Patent No.: US 11,347,546 B2
(45) Date of Patent: May 31, 2022

(54) TASK SCHEDULING METHOD AND DEVICE, AND COMPUTER STORAGE MEDIUM

(71) Applicant: SHANGHAI SENSETIME INTELLIGENT TECHNOLOGY CO., LTD., Shanghai (CN)

(72) Inventors: Yingrui Wang, Shanghai (CN); Zhelong Li, Shanghai (CN)

(73) Assignee: SHANGHAI SENSETIME INTELLIGENT TECHNOLOGY CO., LTD, Shanghai (CN)

(*) Notice: Subject to any disclaimer, the term of this patent is extended or adjusted under 35 U.S.C. 154(b) by 0 days.

(21) Appl. No.: 17/077,186

(22) Filed: Oct. 22, 2020

(65) Prior Publication Data
US 2021/0042155 A1 Feb. 11, 2021

Related U.S. Application Data

(63) Continuation of application No. PCT/CN2019/124494, filed on Dec. 11, 2019.

(30) Foreign Application Priority Data

Mar. 15, 2019 (CN) .......................... 201910200097.3

(51) Int. Cl.
*G06F 9/46* (2006.01)
*G06F 9/48* (2006.01)
*G06F 9/50* (2006.01)
*G06F 9/52* (2006.01)
*G06N 20/00* (2019.01)

(52) U.S. Cl.
CPC .......... *G06F 9/4881* (2013.01); *G06F 9/5016* (2013.01); *G06F 9/52* (2013.01); *G06N 20/00* (2019.01)

(58) Field of Classification Search
CPC .......... G06F 9/4881; G06F 9/5016; G06F 9/52
See application file for complete search history.

(56) References Cited

U.S. PATENT DOCUMENTS

| 2017/0262319 | A1 | 9/2017 | Newburn | |
|---|---|---|---|---|
| 2018/0191706 | A1* | 7/2018 | Hobson | G06F 9/50 |
| 2019/0220257 | A1* | 7/2019 | Liu | G06F 16/00 |

FOREIGN PATENT DOCUMENTS

| CN | 102129390 A | 7/2011 |
|---|---|---|
| CN | 102354289 A | 2/2012 |
| CN | 102360309 A | 2/2012 |

(Continued)

OTHER PUBLICATIONS

International Search Report in the international application No. PCT/CN2019/124494, dated Mar. 10, 2020, 2 pgs.

(Continued)

*Primary Examiner* — Gregory A Kessler
(74) *Attorney, Agent, or Firm* — Cooper Legal Group, LLC

(57) ABSTRACT

Provided are a task scheduling method and device, and a computer storage medium. The task scheduling method includes that: a dependency relationship among multiple operation tasks is determined according to operands corresponding to multiple operation tasks in an operation task queue; and the multiple operation tasks in the operation task queue are scheduled based on the dependency relationship among the multiple operation tasks.

20 Claims, 12 Drawing Sheets

A dependency relationship among multiple operation tasks is determined according to operands corresponding to the multiple operation tasks in an operation task queue — 101

The multiple operation tasks in the operation task queue are scheduled based on the dependency relationship among the multiple operation tasks — 102

(56) References Cited

FOREIGN PATENT DOCUMENTS

| CN | 105637482 A | 6/2016 |
| CN | 106227507 A | 12/2016 |
| CN | 106575246 A | 4/2017 |
| CN | 106648846 A | 5/2017 |
| CN | 104156264 B | 10/2017 |
| CN | 107766144 A | 3/2018 |
| CN | 107886167 A | 4/2018 |
| CN | 104965761 B | 11/2018 |
| JP | 2006228241 A | 8/2006 |
| TW | I578229 B | 4/2017 |
| WO | 2018198745 A1 | 11/2018 |
| WO | 2018223330 A1 | 12/2018 |

OTHER PUBLICATIONS

English translation of the Written Opinion of the International Search Authority in the international application No. PCT/CN2019/124494, dated Mar. 10, 2020, 5 pgs.
First Office Action of the Chinese application No. 201910200097.3, dated Oct. 28, 2021, 18 pgs.
First Office Action of the Japanese application No. 2020-561765, dated Dec. 16, 2021, 5 pgs.
Notice of Allowance of the Chinese application No. 201910200097.3, dated Jan. 28, 2022, 4 pgs.

\* cited by examiner

TASK SCHEDULING METHOD AND DEVICE, AND COMPUTER STORAGE MEDIUM

CROSS REFERENCE TO RELATED APPLICATIONS

This application is a continuation of International Patent Application No. PCT/CN2019/124494, filed on Dec. 11, 2019, which claims priority to Chinese Patent Application No. 201910200097.3, filed on Mar. 15, 2019. The disclosures of International Patent Application No. PCT/CN2019/124494 and Chinese Patent Application No. 201910200097.3 are hereby incorporated by reference in their entireties.

BACKGROUND

Training of a deep learning model is a key part in deep learning. The training process is very complex and hardware resources used are very diverse.

At present, open source frameworks have their own scheduling method to manage the training process of the deep learning model, but most of them describe a dependency relationship among operation tasks through a Directed Acyclic Graph (DAG) to enable the training process to proceed according to a correct procedure. However, the task scheduling method based on such training platform is not efficient.

SUMMARY

The disclosure relates to the field of deep learning, and particularly to a task scheduling method and device, and a computer storage medium.

According a first aspect of the embodiments of the disclosure, a task scheduling method is provided, and the method may include the following operations. A dependency relationship among multiple operation tasks is determined according to operands corresponding to the multiple operation tasks in an operation task queue. The multiple operation tasks in the operation task queue are scheduled based on the dependency relationship among the multiple operation tasks.

According a second aspect of the embodiments of the disclosure, a task scheduling device is provided, which may include: a processor; and a memory configured to store instructions executable by the processor. The processor is configured to call the executable instructions stored in the memory to implement the task scheduling method as described in the first aspect.

In the embodiments of the disclosure, the dependency relationship among multiple operation tasks is determined according to the respective operands corresponding to the multiple operation tasks in the operation task queue, and the multiple operation tasks are scheduled based on the dependency relationship, so that the dependency between the operation tasks is minimized and the operation tasks can be scheduled effectively.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are for the purpose of describing particular embodiments only and are not intended to limit the disclosure. "A/an", "said" and "the" in a singular form in the disclosure and the appended claims are also intended to include a plural form, unless other meanings are clearly denoted throughout the disclosure. It is also to be understood that the term "and/or" as used herein refers to and includes any or all possible combinations of one or more of the associated listed items.

It is to be understood that, although terms first, second, third and the like may be adopted to describe various information in the disclosure, the information should not be limited to these terms. These terms are only adopted to distinguish the information of the same type. For example, without departing from the scope of the disclosure, first information may also be called second information and, similarly, second information may also be called first information. For example, term "if" used here may be explained as "while" or "when" or "responsive to determining", which depends on the context.

The embodiments of the disclosure provide a task scheduling method, which may be applied to a deep learning training platform, for example, a training platform for neural networks, or other devices or platforms that involve hardware resource scheduling and need to improve scheduling efficiency. It is illustrated in the following by taking the deep learning training platform as an example.

Figure 1:
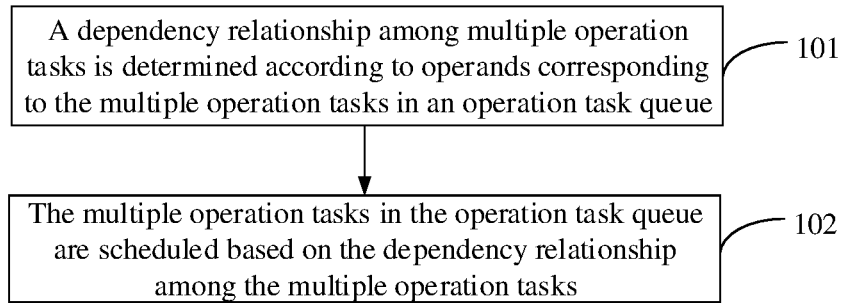
FIG. 1 is a flowchart of a scheduling method according to an exemplary embodiment of the disclosure.

FIG. 1 shows a task scheduling method according to an exemplary embodiment. As shown in FIG. 1, the method may include the following steps.

At S101, a dependency relationship among multiple operation tasks is determined according to operands corresponding to the multiple operation tasks in an operation task queue.

At S102, the multiple operation tasks in the operation task queue are scheduled based on the dependency relationship among the multiple operation tasks.

In the above embodiment, the dependency relationship among the operation tasks is determined based on the operands, which minimizes the dependency among the operation tasks, thereby achieving a fine-grained and efficient scheduling.

In the embodiments of the disclosure, the dependency relationship among multiple operation tasks is determined based on the operands of fine-grained tasks included in the operation tasks. The operand is a data object of the operation task.

In some embodiments, whether there is a dependency between two operation tasks is determined based on the operands of a read operation and/or a write operation included in the operation tasks. Correspondingly, the operands include a read operand corresponding to the read operation and/or a write operand corresponding to the write operation.

Optionally, the operation tasks may include zero, one or more read operations, and may also include zero, one or more write operations. Correspondingly, the operation tasks may correspond to one or more operands.

At S101, optionally, whether there is a dependency between two operation tasks may be determined based on whether the operands of the two operation tasks are the same. For example, if there is no intersection between the operands corresponding to two operation tasks, it is determined that there is no dependency between the two operation tasks. In some embodiments, the dependency relationship among multiple operation tasks may be determined based on the operands in the following manners.

Firstly, there is a dependency between two operation tasks.

If a second operation task in the operation task queue contains a read operation on a write operand of a first operation task, or the second operation task contains a write operation on the operands of the first operation task; the training platform may determine that the second operation task depends on the first operation task.

For example, if an operation task B in the operation task queue needs to read a write operand of an operation task A, it may be determined that the operation task B depends on the operation task A. For another example, if the operation task B in the operation task queue needs to write a write operand and/or a read operand of the operation task A, it may be determined that the operation task B depends on the operation task A.

Secondly, there is no dependency between two operation tasks.

If the second operation task contains a read operation performed on a read operand of the first operation task, the training platform may determine that there is no dependency between the first operation task and the second operation task. For example, if the operation task B in the operation task queue needs to read a read operand of the operation task A, then it may be determined that there is no dependency between the operation task A and the operation task B.

If there is no intersection between the operands corresponding to the first operation task and the operands corresponding to the second operation task, the training platform may determine that there is no dependency between the first operation task and the second operation task. For example, if the operands of the operation task A are a and b, and the operand of the operation task B is c, then the operation task A does not perform any operation on the operand of the operation task B, and the operation task B also does not perform any operation on the operands of the operation task A. Therefore, it may be determined that there is no dependency between the operation task A and the operation task B.

Figure 2:
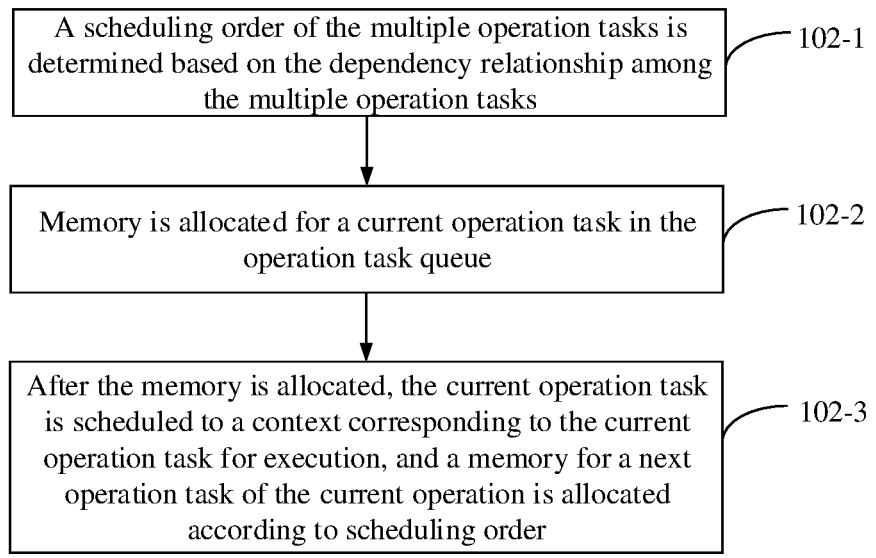
FIG. 2 is a flowchart of a task scheduling method according to another exemplary embodiment of the disclosure.

In an example shown in FIG. 2, S102 may include the following steps.

At S102-1, a scheduling order of the multiple operation tasks is determined based on the dependency relationship among the multiple operation tasks.

If it is determined, as described in S101, that there is no dependency between the first operation task and the second operation task in multiple operation tasks, the training platform may call the first operation task and the second operation task that have no dependency in parallel, or the training platform may call the first operation task and the second operation task in any order. For example, if there is no dependency between the operation task A and the operation task B, then the training platform may call the operation task A and the operation task B in parallel or in sequential order.

If it is determined, as described in S101, that the second operation task depends on the first operation task, the training platform calls the second operation task after calling the first operation task. For example, if the operation task B depends on the operation task A, the training platform firstly schedules the operation task A, and then schedules the operation task B.

At S102-2, memory is allocated for the current operation task in the operation task queue.

After determining the scheduling order of multiple operation tasks based on the dependency relationship among the multiple operation tasks, the training platform may schedule multiple operation tasks in the operation task queue in the scheduling order. The scheduling of a certain operation task in the operation task queue includes two processes: allocating a memory space required for the operation task and scheduling an operator of the operation task to a corresponding context for execution.

At S102-3, after allocation of the memory is completed, the current operation task is scheduled to a context corresponding to the current operation task for execution, and the memory for a next operation task of the current operation is allocated in the scheduling order.

In some embodiments, the training platform may send an operation execution request of the current operation task to a context corresponding to the current operation task after the memory is allocated for the current operation task. At this time, the training platform may start to allocate memory for the next operation task of the current operation task according to the scheduling order without waiting for completion of the current operation task. That is, after the memory is allocated for the current operational task, execution of the current operation task and scheduling of the next operation task may be performed in parallel. The scheduling of the next operation task needs to wait for the completion of allocating memory for the current operation task without waiting for completion of executing the current operation task. In some embodiments, when memory is allocated for a certain operation task, if the memory space is insufficient, it is necessary to wait for completion of at least one operation task before the operation task according to the scheduling order and release sufficient memory space, preparing memory for the current operation task may be continued.

In the above embodiment, for operation tasks without dependency, concurrency among tasks may be fully explored. For operation tasks having a dependency, memory may firstly be allocated for a current operation task, and after the operation execution request of the current operation task is sent, memory allocation for the next operation task of the current operation task may be performed without waiting for completion of the current operation task. Through the above process, a fine-grained and efficient scheduling is achieved.

In some embodiments, during practical application of the training platform, improvement of communication efficiency between different computing nodes is also a key to improve training efficiency, and communication messages affect the extensibility of the training platform. When training is performed on the training platform, a Graphics Processing Unit (GPU) is usually used for computation. A Nvidia Collective multi-GPU Communication Library (NCCL) is usually used for communication in the environment of a Nvidia GPU cluster.

An implementation mechanism of the NCCL is to connect all communication nodes in an end-to-end manner to form a unidirectional ring, and to transmit data fragments in pipelines. Ideally, communication time does not increase as the number of nodes increases and is related to only the total amount of data and bandwidth, but this is only true when the number of pieces of the data is much greater than the number of nodes. Such feature makes the NCCL inefficient when the amount of data is relatively small. In order to obtain a large amount of communication data, operation merging of communication operation tasks is introduced. A communication task is a task performed among multiple computing nodes, while a non-communication task is a task performed on a single computing node.

Figure 3:
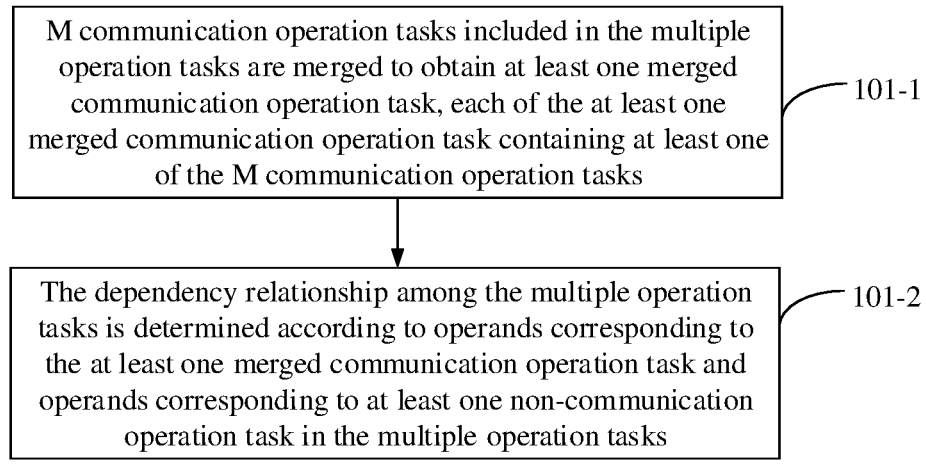
FIG. 3 is a flowchart of a task scheduling method according to yet another exemplary embodiment of the disclosure.

Optionally, in an example shown in FIG. 3, S101 may include the following steps.

At S101-1, M communication operation tasks included in the multiple operation tasks are merged to obtain at least one merged communication operation task, each of the at least one merged communication operation task containing at least one of the M communication operation tasks.

In this step, M may be an integer greater than or equal to 1. The training platform may perform merging of multiple communication operation tasks to obtain one or more merged communication operation tasks. The number of communication operation tasks included in each of the one or more merged communication operation tasks may be one or more.

At S101-2, the dependency relationship among the multiple operation tasks is determined according to the operands corresponding to the at least one merged communication operation task and the operands corresponding to at least one non-communication operation task in the multiple operation tasks.

In this step, the training platform may perform merging of the read operands and/or write operands corresponding to at least one communication operation task in the at least one merged communication operation task, to obtain a set of merged read operands and/or a set of merged write operands. As a result, the set of the read operands is taken as the read operand corresponding to the at least one merged communication operation task, and the set of the write operands is taken as the write operand corresponding to the at least one merged communication operation task. For example, each operation task has its own read operand and write operand. By merging at least one communication operation task, a union of the read operands and/or write operands may be separately taken for the multiple operation tasks.

Further, the training platform may determine the dependency relationship between different merged communication operation tasks according to the operands corresponding to the at least one merged communication operation task. The training platform may determine a dependency relationship between the merged communication operation task and at least one non-communication operation task according to the operands corresponding to the at least one merged communication operation task and the operands corresponding to at least one non-communication operation task in multiple operation tasks.

The manner of determining the dependency relationship is the same as that of determining the dependency relationship between at least two operation tasks in the above embodiment, which will not elaborate herein.

In the above embodiments, after merging multiple communication operation tasks into at least one merged communication operation task, the training platform may determine the dependency relationship between the at least one merged communication operation tasks, and/or determine the dependency relationship between at least one merged communication operation task and at least one non-communication operation task according to the operands corresponding to the at least one merged operation task and the operands corresponding to the at least one non-communication operation task in multiple operation tasks. Therefore, a larger amount of communication data is obtained, so that the training platform is more efficient in communication.

In some embodiments, the operation task queue may be divided into a first operation task queue and a second operation task queue. The first operation task queue contains one or more communication operation tasks in multiple operation tasks. Optionally, the first operation task queue is a remote communication queue. The second operation task queue contains one or more non-communication operation tasks in multiple operation tasks. Optionally, the second operation task queue is a local queue.

The remote communication queue includes operation tasks for data exchange between the current computing node and other computing nodes. The local queue includes the tasks performed on the current computing node, for example an operation task such as Central Processing Unit (CPU) computation, GPU computation, data transmission from CPU to GPU, and data transmission from GPU to CPU.

The operation tasks contained in each of the above two queues are arranged in a scheduling order determined based on the dependency relationship among multiple operation tasks in the operation task queue. Therefore, there is no need to record information of dependency of one or more operation tasks in the same queue, and the scheduling order may be guaranteed according to a First In First Out (FIFO) mechanism in queue.

For example, an operation task B depends on an operation task A, the scheduling order is the operation task A first and then operation task B, and both the operation task A and the operation task B are communication operation tasks. In this case, the operation task A is prior to the operation task B in the first operation task queue, and based on the FIFO mechanism in queue, the operation task A is scheduled firstly and then the operation task B is scheduled. In this way, there is no need to record information of dependency between the operation task B and the operation task A.

Similarly, if both the operation task A and the operation task B are non-communication operation tasks, the operation task A also precedes the operation task B in the first operation task queue, and there is no need to record information of dependency between the operation task B and the operation task A.

Through the above process, the communication operation task may be performed faster. For example, an operation task E depends on an operation task A, and both the operation task A and the operation task E are the communication operation tasks. In this case, the operation task E may be scheduled only after the operation task A, the operation task B, the operation task C and the operation task D are scheduled in sequence order in the operation task queue. If the operation task queue is divided into a first operation task queue and a second operation task queue, then the first operation task queue includes the operation task A and the operation task E, and the second operation task queue includes the operation task B, the operation task C and the operation task D. In the first operation task queue, the operation task E may be performed after the operation task A is performed completely without waiting for the completion of the operation task B, the operation task C and the operation task D.

In the above embodiment, the communication operation task and the non-communication operation task are stored in the first operation task queue and the second operation task queue respectively, overlap of communication tasks is realized effectively and the parallel efficiency of system is improved.

Figure 4:
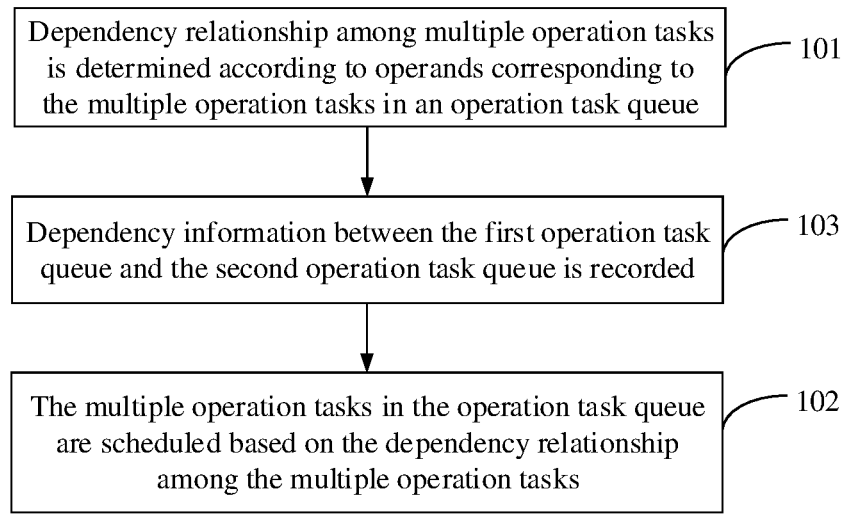
FIG. 4 is a flowchart of a task scheduling method according to still another exemplary embodiment of the disclosure.

In some embodiments, in an example as shown in FIG. 4, the task scheduling method may further include the following steps.

At S103, dependency information between the first operation task queue and the second operation task queue is recorded. If an operation task in the first operation task queue depends on one or more operation tasks in the second operation task queue, the dependency information includes information of the last operation task in the one or more operation tasks. And/or, if an operation task in the second operation task queue depends on at least one operation task in the first operation task queue, the dependency information includes information of the last operation task of the at least one operation task.

Figure 5:
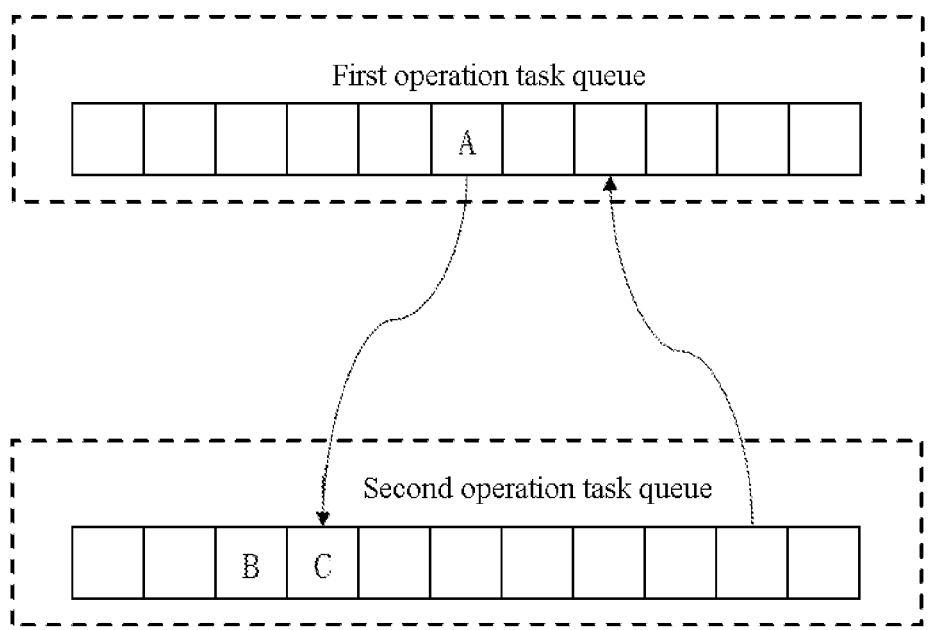
FIG. 5 is a schematic diagram of a communication overlap scenario according to an exemplary embodiment of the disclosure.

In this step, if there is a dependency relationship between the operation tasks in different operation task queues, the training platform may record the information of the last operation task of the dependency between two operation task queues depend, as shown in FIG. 5. For example, if an operation task A in the first operation task queue depends on operation tasks B and C in the second operation task queue, and the operation task C depends on the operation task B, then only the dependency of the operation task A on the operation task C is recorded.

Further, S102 may include that: the operation tasks in the first operation task queue and the second operation task queue are scheduled based on the dependency information between the first operation task queue and the second operation task queue.

According to the embodiment, the information of the last operation task of the dependency between two operation task queues is recorded, communication operation tasks in the first operation task queue may be performed faster without waiting for completion of all the non-communication operation tasks, thereby achieving efficient overlap between communication tasks.

In some embodiments, memory management is a complex and critical problem in a dynamic scheduling scheme. If memory cannot be reclaimed correctly and timely, a target operation task cannot be scheduled as early as possible, or the number of samples that can be computed is reduced. To solve the problem, the embodiments of the disclosure propose to set a priority corresponding to a memory reclaim operation task to be the highest.

Figure 6:
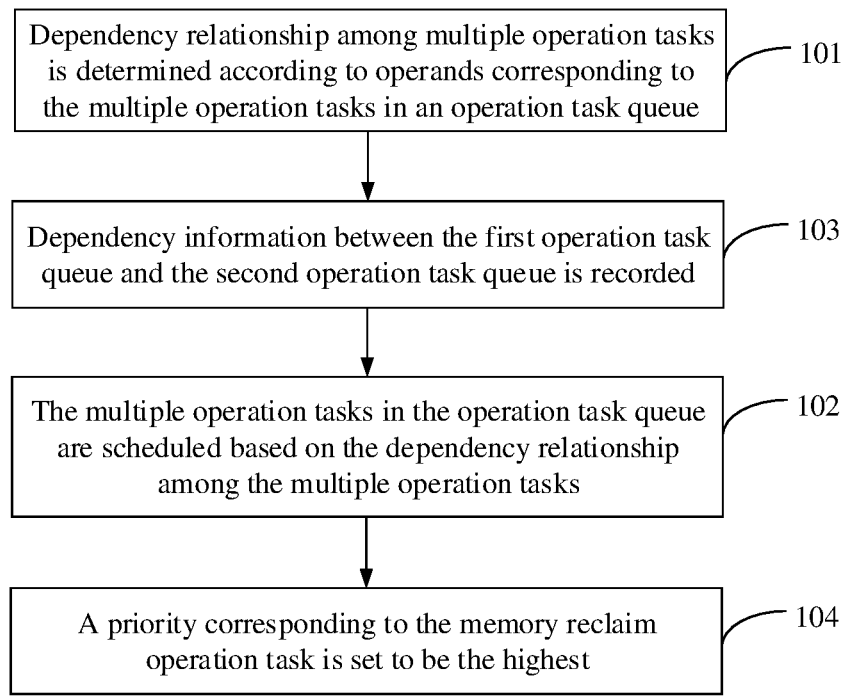
FIG. 6 is a flowchart of a task scheduling method according to yet another exemplary embodiment of the disclosure.

FIG. 6 shows another task scheduling method based on the embodiment in FIG. 4. As shown in FIG. 6, the task scheduling method may further include the following step.

At S104, the priority corresponding to the memory reclaim operation task is set to be the highest, the second operation task queue including non-communication operation tasks except the memory reclaim operation task in the operation task queue.

In this step, if a certain operation task is scheduled to a respective context, the training platform may delete the operation task from the task queue where it is located, and delete a memory reclaim operation set corresponding to the operation task. That is, after a certain target operation task is scheduled to a respective context, the training platform may set an operation of reclaiming the memory occupied by the target operation task in advance, so as to quickly reclaim the occupied memory after the target operation task is completed.

The memory reclaim operation in this step is a logical operation that marks a memory as available for reallocation, while the operation tasks that are not completed may continue to use the memory. In the embodiments of the disclosure, since an operation task performed on the reallocated memory must be queued after that before the reclaiming, a computing order on the stream ensures that the two operation tasks do not conflict with each other.

In the embodiments of the disclosure, optionally, the memory reclaim operation is not stored in the first operation task queue or the second operation task queue like other target operation tasks, but is stored in an additional mapping data structure. In the data structure, a key is a non-memory reclaim operation being depended, that is, a corresponding target operation task is the one being depended, and the memory reclaim operation is stored in a vector to which a value points.

In the above embodiment, the priority corresponding to the memory reclaim operation task is set to be the highest, and the memory reclaim operation is stored independently to ensure that memory resources are cleaned up timely, which makes the memory of the training platform to be reclaimed more efficiently.

Figure 7:
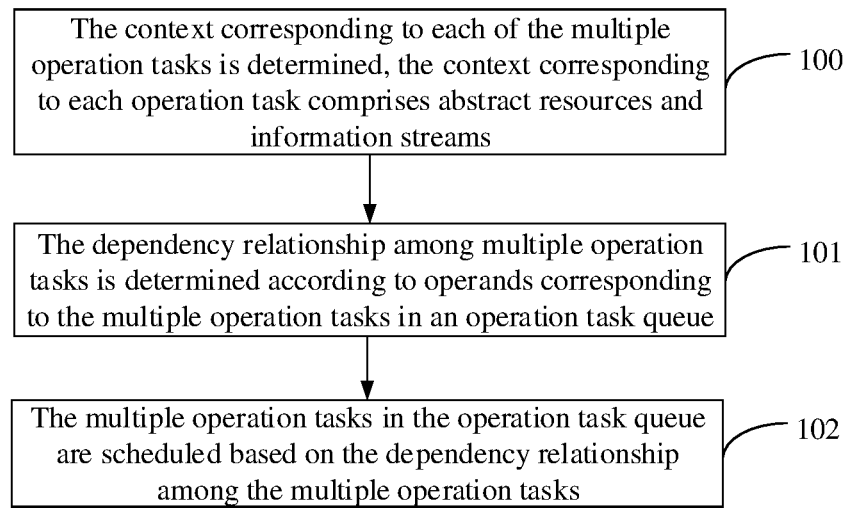
FIG. 7 is a flowchart of a task scheduling method according to yet another exemplary embodiment of the disclosure.

In some embodiments, in an example as shown in FIG. 7, the task scheduling method may further include the following step.

At S100, a context corresponding to each of the multiple operation tasks is determined, the context corresponding to each operation task includes abstract resources and information streams.

In some embodiments of the disclosure, the training platform may abstract hardware resources in the system and provide unified logic management and interface for each of the hardware resources, so as to obtain the following abstract resources: GPU computation resources, Peripheral Component Interconnect Express (PCIE) uplink transmission resources, PCIE downlink transmission resources, InfiniBand (IB) network resources and CPU computation resources.

After obtaining the abstract resources, the operation task queue of each abstract resource may be further encapsulated. The operation tasks corresponding to the GPU computation resources, the PCIE uplink transmission resources, the PCIE downlink transmission resources and the IB network resources are essentially encapsulation of an asynchronous CUDA stream. As a result, the information streams corresponding to the GPU computation resources, the PCIE uplink transmission resources, the PCIE downlink transmission resources and the IB network resources may be a CUDA stream. The information stream corresponding to the CPU computation resources may be a host stream.

Figure 8:
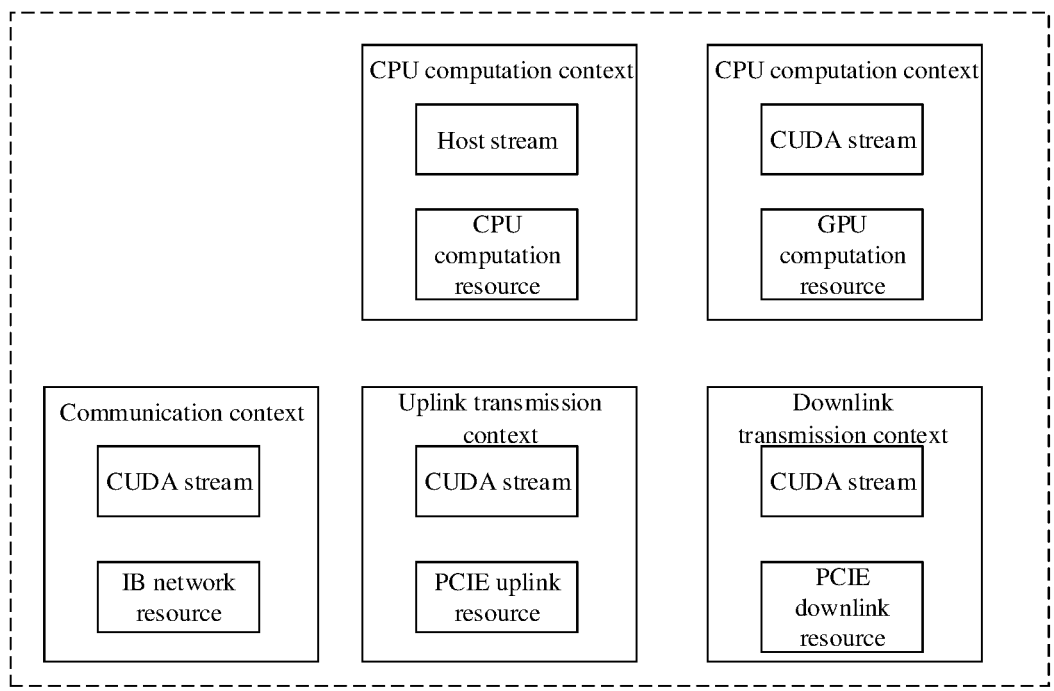
FIG. 8 is a schematic diagram of hardware resource contexts according to an exemplary embodiment of the disclosure.

Contexts of an operation task include abstract resources and respective information streams, as shown in FIG. 8.

The training platform may divide multiple operation tasks in the operation task queue into operation tasks corresponding one-to-one to each abstract resources according to a context corresponding to each of the hardware resources.

Figure 9:
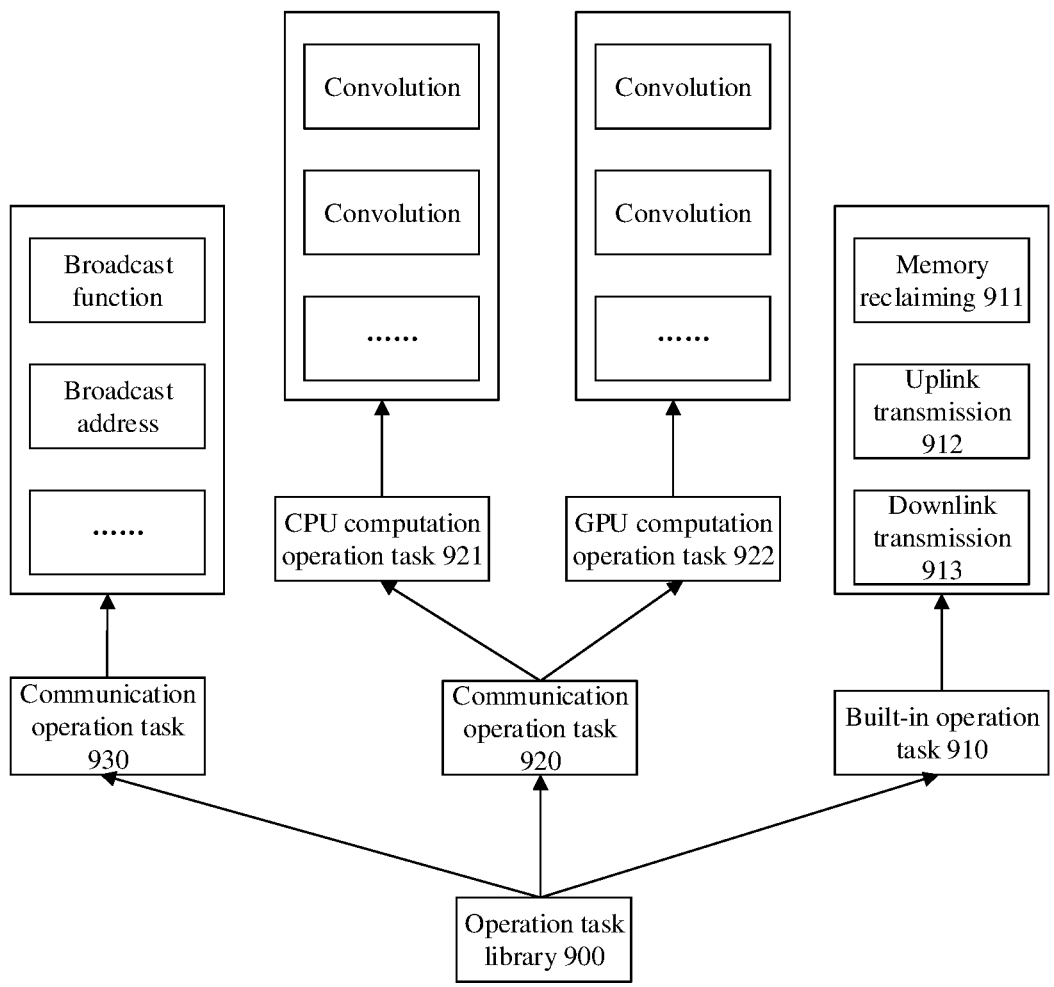
FIG. 9 is a schematic diagram of division of operation tasks according to an exemplary embodiment of the disclosure.

As shown in FIG. 9, multiple operation tasks may be taken as an operation task library 900, which may be divided into a built-in operation task and an extensible operation task. The built-in operation task 910 may implement built-in functions of the system, such as uplink transmission 912, downlink transmission 913, and memory reclaiming 911. The extensible operation task may be added by a user of the training platform as desired. Optionally, the operation task library 900 may be further divided into a communication operation task 920 and a communication operation task 930. The communication operation task 920 may also be divided into a CPU computation operation task 921 and a GPU computation operation task 922.

Each of the divided operation tasks corresponds to a respective context. Correspondingly, S102 may include that: multiple operation tasks in the operation task queue are scheduled based on the context corresponding to each of the multiple operation tasks and the dependency relationship among the multiple operation tasks.

That is, the training platform may schedule the multiple operation tasks based on the context corresponding to each operation task and the dependency relationship among the multiple operation tasks. The specific implementation process is as follows.

Firstly, there is no dependency between two operation tasks.

The training platform may schedule two operation tasks in parallel if there is no dependency between the two operation tasks in the multiple operation tasks and the two operation tasks correspond to different abstract resources.

Secondly, there is a dependency between two operation tasks.

Assuming that a fourth operation task depends on a third operation task, the training platform determines information streams corresponding to the third operation task and the fourth operation task respectively. The training platform determines a synchronous interface of the third operation task and the fourth operation task based on the information streams corresponding to the third operation task and the fourth operation task.

In some embodiments, if the respective information streams corresponding to the third operation task and the fourth operation task are both the CUDA stream, the training platform may call a first synchronous interface to synchronize the third operation task and the fourth operation task. Optionally, the first synchronous interface may be the cudaStreamWaitEvent ( ) interface.

In the embodiments of the disclosure, operations such as status query, waiting for completion may be performed on the operation tasks in the operation task queue through CUDA Event. A fine-grained and lightweight implicit synchronization manner is provided based on the CUDA Event. If the training platform detects that there is a dependency between any two of the operation tasks, and respective information streams corresponding to the two operation tasks are both the CUDA Stream, the training platform may call the first synchronous interface.

For example, the first synchronous interface is called to determine the current state of the third operation task, for example, whether the third operation task is scheduled, so as to synchronize the third operation task and the fourth operation task.

Herein, synchronization is performed to ensure the correctness of computation of the two operation tasks with the dependency relationship. For example, assuming that the fourth operation task depends on the third operation task, the purpose of synchronizing the third operation task and the fourth operation task is to have the fourth operation task start after execution of the third operation task is completed.

In some embodiments, if the information stream corresponding to at least one of the third operation task and the fourth operation task is the host stream, a second synchronous interface may be called to synchronize the third operation task and the fourth operation task. Optionally, the second synchronous interface may be the cudaStreamSynchronize ( ) interface.

In some embodiments, if the information streams corresponding to the third operation task and the fourth operation task both are not the host stream, the first synchronous interface may be called to synchronize the third operation task and the fourth operation task.

In the embodiments, a delay and overhead of the training platform during calling the first synchronous interface are less than that during calling the second synchronous interface, and thus a more efficient utilization of hardware system may be achieved.

Figure 10:
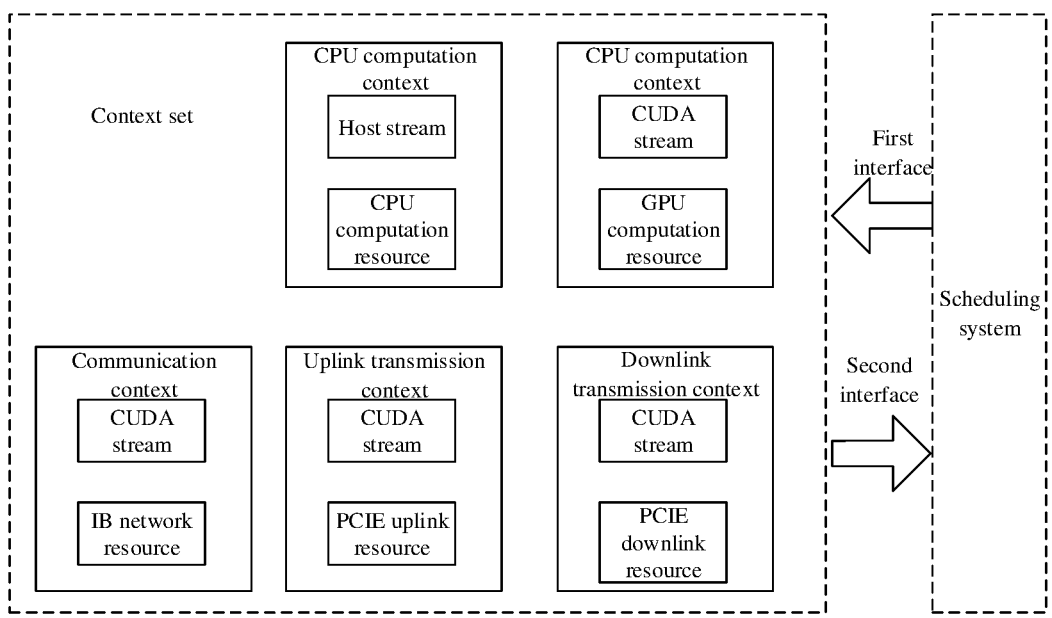
FIG. 10 is a schematic diagram of interfaces between a set of contexts and a scheduling system according to an exemplary embodiment of the disclosure.

In some embodiments, a first interface and a second interface may exist between hardware resource contexts and a scheduling system of the training platform, as shown in FIG. 10. The first interface is used by the scheduling system to issue the operation tasks to be scheduled to the specified contexts. Optionally, the first interface may be a schedule ( ) interface. The second interface is used by the scheduling system to synchronize any context. Optionally, the second interface may be a synchronize ( ) interface.

In the embodiments, different interfaces are provided between the hardware resource contexts and the scheduling system, which further improves utilization of the hardware resources.

Figure 11:
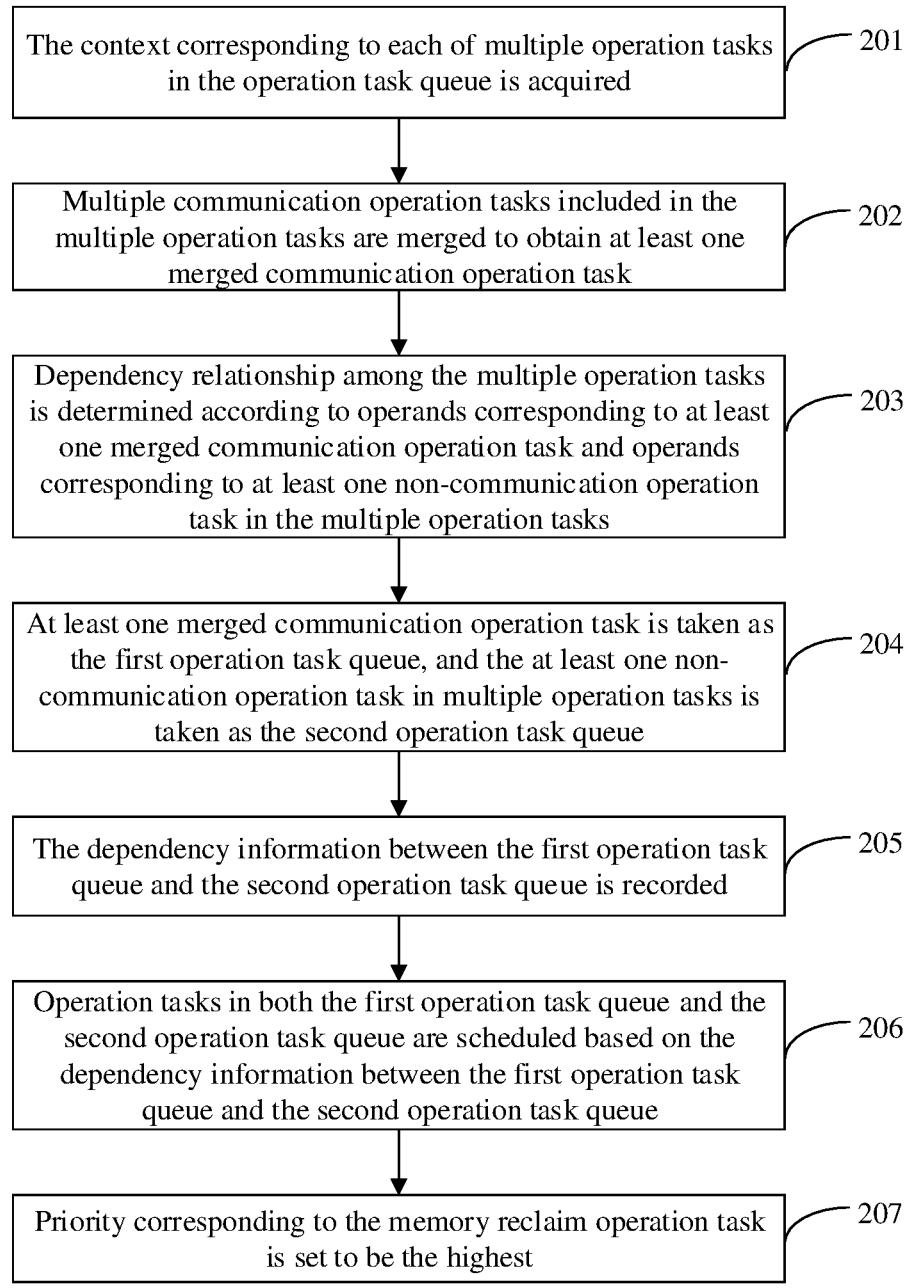
FIG. 11 is a flowchart of a task scheduling method according to yet another exemplary embodiment of the disclosure.

In some embodiments, in an example as shown in FIG. 11, the task scheduling method may include the following steps.

At S201, a context corresponding to each of multiple operation tasks in the operation task queue is acquired.

At S202, multiple communication operation tasks included in the multiple operation tasks are merged to obtain at least one merged communication operation task.

At S203, the dependency relationship among the multiple operation tasks is determined according to operands corresponding to the at least one merged communication operation task and operands corresponding to at least one non-communication operation task in the multiple operation tasks.

If a second operation task in the multiple operation tasks contains the read operation performed on the write operand of the first operation task, or the second operation task contains the write operation performed on the operands of the first operation task, it is determined that the second operation task depends on the first operation task.

If the second operation task contains the read operation performed on the read operand of the first operation task, it is determined that there is no dependency between the first operation task and the second operation task.

At S204, at least one merged communication operation task is taken as the first operation task queue, and at least one non-communication operation task in the multiple operation tasks is taken as the second operation task queue.

The operation task queues may include the first operation task queue and the second operation task queue. The first operation task queue includes the at least one merged communication operation task in the multiple operation tasks, and the second operation task queue contains the at least one non-communication operation task in the multiple operation tasks. The operation tasks in the first operation task queue and the second operation task queue are arranged in a scheduling order determined based on the dependency relationship among the multiple operation tasks.

At S205, the dependency information between the first operation task queue and the second operation task queue is recorded.

At S206, the operation tasks in the first operation task queue and the second operation task queue are scheduled based on the dependency information between the first operation task queue and the second operation task queue.

At S207, a priority corresponding to the memory reclaim operation task is set to be the highest.

The second operation task queue includes the at least one non-communication operation task except the memory reclaim operation task in the operation task queue.

S207 may be performed after the operation tasks having dependency are scheduled to their corresponding contexts. The processing procedure of all the above steps is consistent with that provided in previous embodiments, and will not elaborate herein.

In the above embodiments, all kinds of hardware resources are abstracted and encapsulated. On this basis, an asynchronous task queue is designed for each kind of resources, and thus a flexible and efficient implicit synchronization strategy between queues is proposed.

In addition, the dependency relationship among the multiple operation tasks is determined based on the operands corresponding to the multiple operation tasks minimizes the dependency among operations and realizes an efficient dependency analyzing and scheduling strategy. Therefore, task concurrency between operations having no dependency is fully exploited and utilization of hardware resources is improved. In addition, a dependency delay between the operations having dependency relationship is reduced through implicit synchronization. The embodiments of the disclosure also provide an efficient communication merging and overlapping scheme. The efficiency of communication operation is improved through communication merge, the overall efficiency of training process is improved through communication overlap, and problems such as dependency merge and multi-task queue interdependence introduced in the merging and overlapping process are solved. The memory reclaim operation is defined as an operation with the highest priority, so as to ensure that the memory resources are cleaned up timely, thereby achieving an efficient memory reclaim.

Corresponding to the above method embodiments, the disclosure also provides device embodiments.

Figure 12:
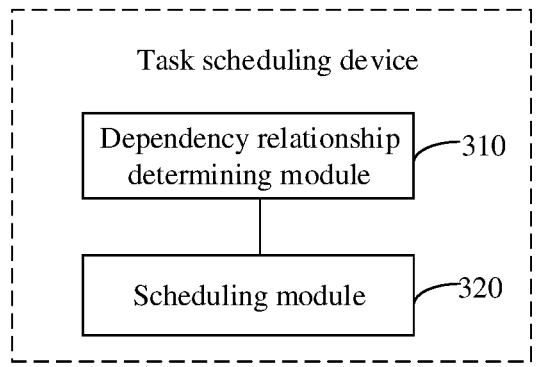
FIG. 12 is a block diagram of a task scheduling device according to an exemplary embodiment of the disclosure.

FIG. 12 is a block diagram of a task scheduling device according to an exemplary embodiment of the disclosure. As shown in FIG. 12, the device may include a dependency relationship determining module 310 and a scheduling module 320.

The dependency relationship determining module 310 is configured to determine the dependency relationship among multiple operation tasks according to operands corresponding to the multiple operation tasks in an operation task queue.

The scheduling module 320 is configured to schedule the multiple operation tasks in the operation task queue based on the dependency relationship among the multiple operation tasks.

Optionally, the operands corresponding to the operation tasks include the read operand and/or the write operand.

Figure 13:
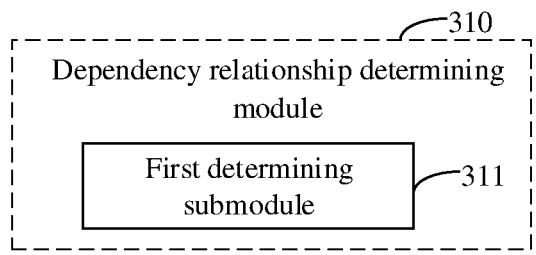
FIG. 13 is a block diagram of a task scheduling device according to another exemplary embodiment of the disclosure.

FIG. 13 is another block diagram of a task scheduling device according to an exemplary embodiment of the disclosure. As shown in FIG. 13, based on the embodiment in FIG. 12, the dependency relationship determining module 310 may include: a first determining submodule 311. The first determining submodule 311 is configured to determine that the second operation task depends on the first operation task if the second operation task contains a read operation performed on the write operand of the first operation task, or the second operation task contains a write operation performed on an operand of the first operation task. The first operation task and the second operation task are different operation tasks in the operation task queue.

Figure 14:
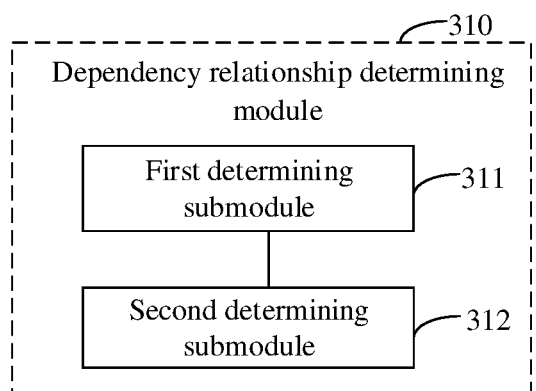
FIG. 14 is a block diagram of a task scheduling device according to yet another exemplary embodiment of the disclosure.

FIG. 14 is another block diagram of a task scheduling device according to an exemplary embodiment of the disclosure. As shown in FIG. 14, based on the embodiment in FIG. 13, the dependency relationship determining module 310 may further include: a second determining submodule 312. The second determining submodule 312 is configured to determine that there is no dependency between the first operation task and the second operation task if the second operation task contains the read operation performed on the read operand of the first operation task.

Figure 15:
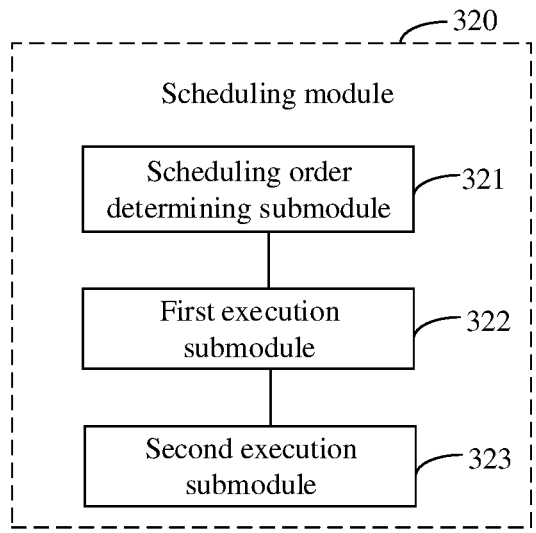
FIG. 15 is a block diagram of a task scheduling device according to yet another exemplary embodiment of the disclosure.

FIG. 15 is another block diagram of a task scheduling device according to an exemplary embodiment of the disclosure. As shown in FIG. 15, based on the embodiment in FIG. 12, the scheduling module 320 may include a scheduling order determining submodule 321, a first execution submodule 322 and a second execution submodule 323. The scheduling order determining submodule 321 is configured to determine the scheduling order of the multiple operation tasks based on the dependency relationship among the multiple operation tasks. The first execution submodule 322 is configured to allocate memory for the current operation task in the operation task queue. The second execution submodule 323 is configured to schedule, after allocation of the memory is completed, the current operation task to the context corresponding to the current operation task for execution, and allocate memory for the next operation task of the current operation task in the scheduling order.

Figure 16:
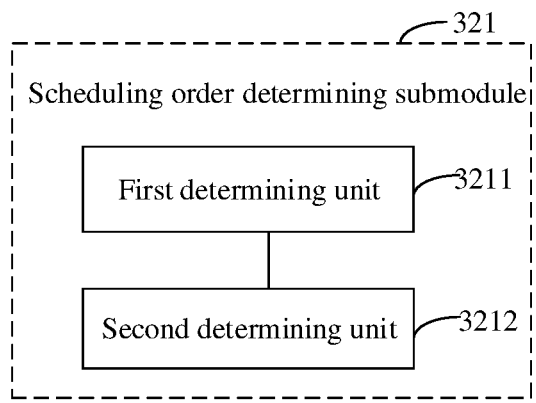
FIG. 16 is a block diagram of a task scheduling device according to yet another exemplary embodiment of the disclosure.

FIG. 16 is another block diagram of a task scheduling device according to an exemplary embodiment of the disclosure. As shown in FIG. 16, based on the embodiment in FIG. 15, the scheduling order determining submodule 321 may include a first determining unit 3211 and/or a second determining unit 3212. The first determining unit 3211 is configured to determine that the first operation task and the second operation task are scheduled in parallel if there is no dependency between the first operation task and the second operation task in the multiple operation tasks. The second determining unit 3212 is configured to determine that the second operation task is scheduled after the first operation task if the second operation task depends on the first operation task.

Figure 17:
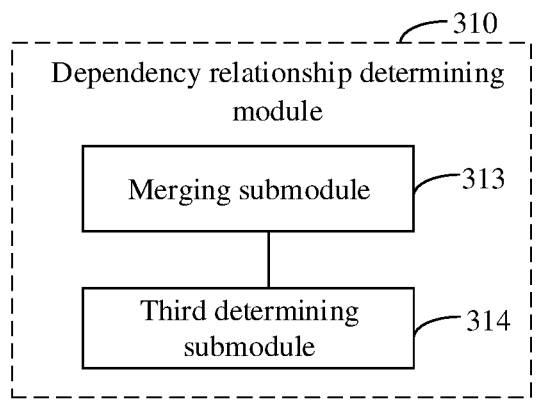
FIG. 17 is a block diagram of a task scheduling device according to yet another exemplary embodiment of the disclosure.

FIG. 17 is another block diagram of a task scheduling device according to an exemplary embodiment of the disclosure. As shown in FIG. 17, based on the embodiment in FIG. 12, the dependency relationship determining module 310 may include: a merging submodule 313 and a third determining submodule 314. The merging submodule 313 is configured to merge M communication operation tasks included in the multiple operation tasks to obtain at least one merged communication operation task, each of the at least one merged communication operation task including at least one of the M communication operation tasks, M being an integer greater than or equal to 1. The third determining submodule 314 is configured to determine the dependency relationship among the multiple operation tasks according to the operands corresponding to at least one merged communication operation task and the operands corresponding to at least one non-communication operation task in the multiple operation tasks.

Optionally, the operands corresponding to the at least one merged communication operation task include: a set of read operands corresponding to the at least one communication operation task in the at least one merged communication operation task, and/or a set of write operands corresponding to the at least one communication operation task in the merged communication operation task.

Optionally, the operation task queues include the first operation task queue and the second operation task queue. The first operation task queue contains one or more communication operation tasks in the multiple operation tasks, and the second operation task queue contains one or more non-communication operation tasks in the multiple operation tasks. The operation tasks in the first operation task queue and the second operation task queue are arranged in the scheduling order determined based on the dependency relationship among the multiple operation tasks.

Figure 18:
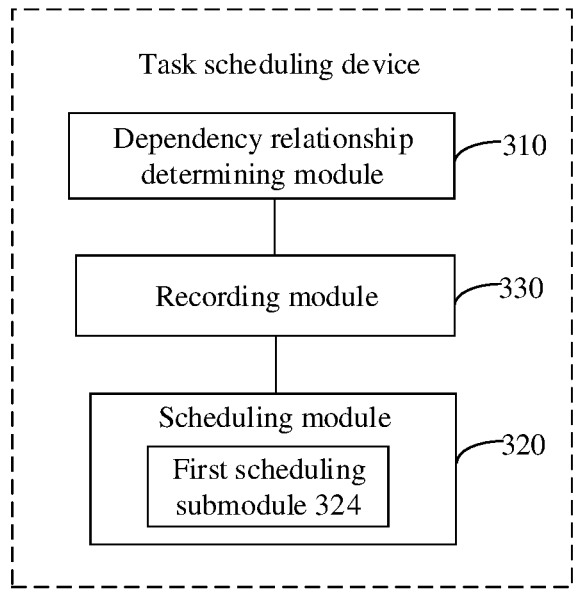
FIG. 18 is a block diagram of a task scheduling device according to yet another exemplary embodiment of the disclosure.

FIG. 18 is another block diagram of a task scheduling device according to an exemplary embodiment of the disclosure. As shown in FIG. 18, based on the embodiment in FIG. 12, the device may further include: a recording module 330, configured to record the dependency information between the first operation task queue and the second operation task queue. If the operation task in the first operation task queue depends on at least one operation task in the second operation task queue, or if the operation task in the second operation task queue depends on at least one operation task in the first operation task queue, the dependency information includes the information of the last operation task of the at least one operation task.

The scheduling module 320 may include a first scheduling submodule 324, configured to schedule the operation tasks in the first operation task queue and the second operation task queue based on the dependency information between the first operation task queue and the second operation task queue.

Figure 19:
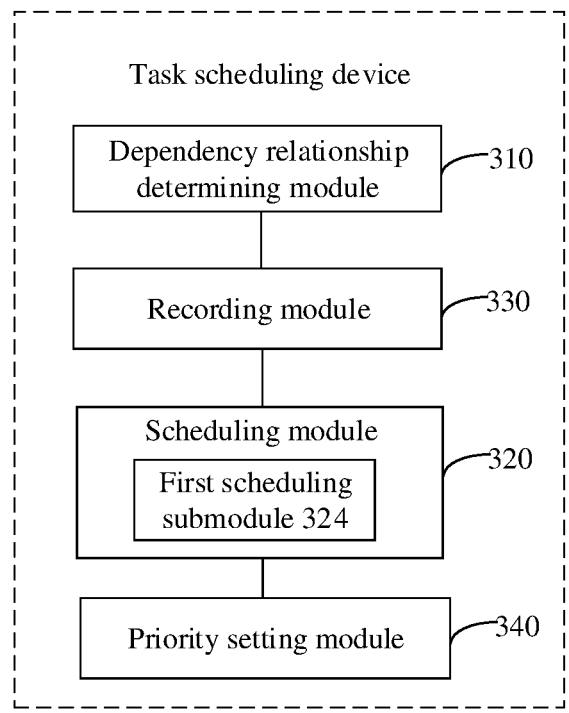
FIG. 19 is a block diagram of a task scheduling device according to yet another exemplary embodiment of the disclosure.

FIG. 19 is another block diagram of a task scheduling device according to an exemplary embodiment of the disclosure. As shown in FIG. 19, based on the embodiment in FIG. 18, the device may further include a priority setting module 340, configured to set the priority corresponding to the memory reclaim operation task to be the highest. The second operation task queue includes the at least one non-communication operation task except the memory reclaim operation task in the operation task queue.

Figure 20:
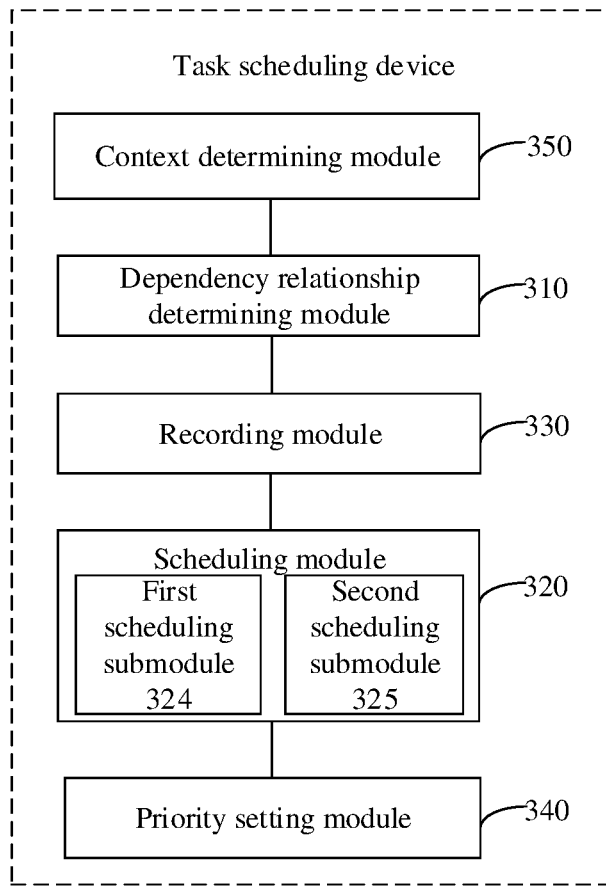
FIG. 20 is a block diagram of a task scheduling device according to yet another exemplary embodiment of the disclosure.

FIG. 20 is another block diagram of a task scheduling device according to an exemplary embodiment of the disclosure. As shown in FIG. 20, based on the embodiment in FIG. 19, the device may further include a context determining module 350, configured to determine a context corresponding to each of the multiple operation tasks. The context corresponding to the operation task includes the abstract resources and the information streams.

The scheduling module 320 may include: a second scheduling submodule 325, configured to schedule the multiple operation tasks in the operation task queue based on the context corresponding to each of the multiple operation tasks and the dependency relationship among the multiple operation tasks.

Optionally, the information streams include the CUDA stream and/or the host stream.

Figure 21:
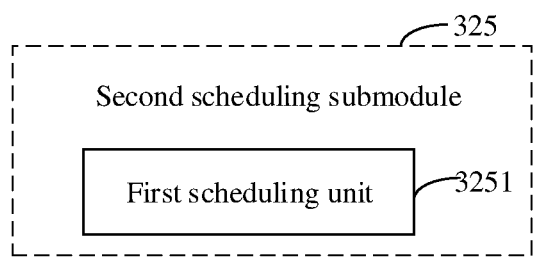
FIG. 21 is a block diagram of a task scheduling device according to yet another exemplary embodiment of the disclosure.

FIG. 21 is another block diagram of a task scheduling device according to an exemplary embodiment of the disclosure. As shown in FIG. 21, based on the embodiment in FIG. 20, the second scheduling submodule 325 may include a first scheduling unit 3251. The first scheduling unit is configured to schedule at least two operation tasks in parallel if there is no dependency between at least two operation tasks in multiple operation tasks and the at least two operation tasks correspond to different abstract resources.

Figure 22:
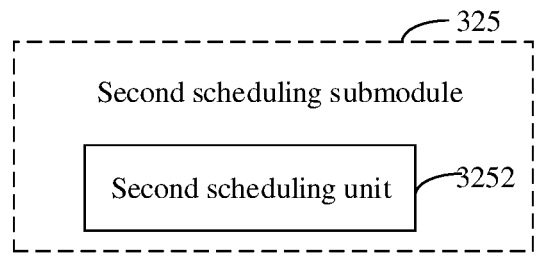
FIG. 22 is a block diagram of a task scheduling device according to yet another exemplary embodiment of the disclosure.

FIG. 22 is another block diagram of a task scheduling device according to an exemplary embodiment of the disclosure. As shown in FIG. 22, based on the embodiment in FIG. 20, the second scheduling submodule 325 may include a second scheduling unit 3252. The second scheduling unit 3252 is configured to synchronize the third operation task and the fourth operation task by calling a first synchronous interface if there is a dependency between the third operation task and the fourth operation task in multiple operation tasks and the respective information streams corresponding to the third operation task and the fourth operation task are both the CUDA stream.

Figure 23:
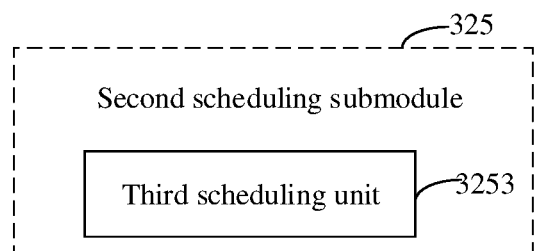
FIG. 23 is a block diagram of a task scheduling device according to yet another exemplary embodiment of the disclosure.

FIG. 23 is another block diagram of a task scheduling device according to an exemplary embodiment of the disclosure. As shown in FIG. 23, based on the embodiment in FIG. 20, the second scheduling submodule 325 may include a third scheduling unit 3253. The third scheduling unit 3253 is configured to synchronize the third operation task and the fourth operation task by calling a second synchronous interface if there is a dependency between the third operation task and the fourth operation task in multiple operation tasks and the information stream corresponding to at least one of the third operation task and the fourth operation task is the host stream.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the disclosure. Those of ordinary skill in the art may understand and implement without creative work.

The embodiments of the disclosure also provide a non-transitory computer-readable storage medium, which stores computer programs. The computer programs are configured to execute any above task scheduling method.

The embodiments of the disclosure also provide a task scheduling device, which includes: a processor and a memory configured to store instructions executable by the processor. The processor is configured to call the executable instructions stored in the memory to implement any above task scheduling method.

Figure 24:
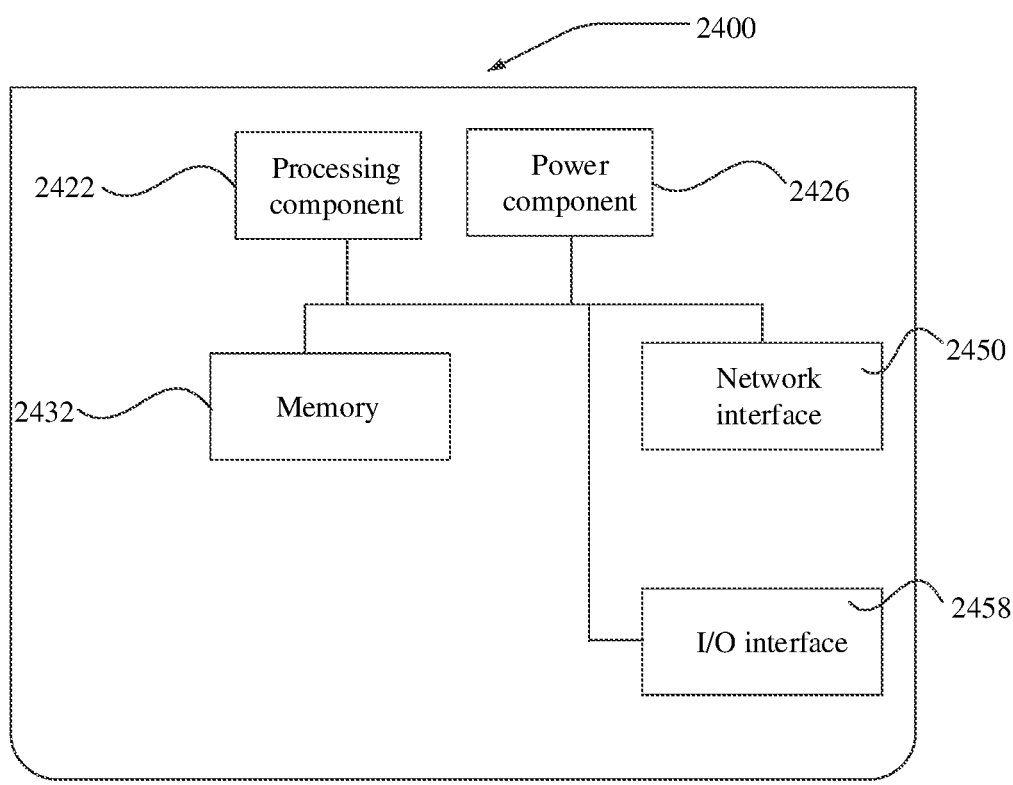
FIG. 24 is a structural schematic diagram of a task scheduling device according to an exemplary embodiment of the disclosure.

FIG. 24 is a structural schematic diagram of a task scheduling device 2400 according to an exemplary embodiment. For example, the device 2400 may be provided as a task scheduling device. Referring to FIG. 24, the device 2400 includes a processing component 2422 including one or more processors, and a memory resource represented by a memory 2432, configured to store instructions executable by the processing component 2422, for example, an Application. The application stored in the memory 2432 may include one or more modules, each of which corresponds to a set of instructions. In addition, the processing component 2422 is configured to execute the instruction to execute any above task scheduling method.

The device 2400 may further include a power component 2426 configured to execute power management of the device 2400, a wired or wireless network interface 2450 configured to connect the device 2400 to a network and an Input/Output (I/O) interface 2458. The device 2400 may be operated based on an operating system stored in the memory 2432, for example, Windows Server™, Mac OS X™, Unix™, Linux™, FreeB SD™ or the like.

The embodiments of the disclosure also provide a computer program. The computer program includes instructions used for implementing the method in any possible implementation mode.

Other implementation solutions of the disclosure will be apparent to those skilled in the art from consideration of the specification and practice of the disclosure. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

The above is only the preferred embodiment of the disclosure and not intended to limit the disclosure. Any modifications, equivalent replacements, improvements and the like made within the spirit and principle of the disclosure shall fall within the scope of protection of the disclosure.

The invention claimed is:

1. A task scheduling method, comprising:
   determining a dependency relationship among multiple operation tasks according to operands corresponding to the multiple operation tasks in an operation task queue; and
   scheduling the multiple operation tasks in the operation task queue based on the dependency relationship among the multiple operation tasks,
   wherein determining the dependency relationship among the multiple operation tasks according to the operands corresponding to the multiple operation tasks in the operation task queue comprises:
      merging M communication operation tasks included in the multiple operation tasks to obtain at least one merged communication operation task, wherein each of the at least one merged communication operation task comprises at least one of the M communication operation tasks, M being an integer greater than or equal to 1; and
      determining the dependency relationship among the multiple operation tasks according to operands corresponding to the at least one merged communication operation task and operands corresponding to at least one non-communication operation task in the multiple operation tasks.

2. The method of claim 1, wherein the operands corresponding to the multiple operation tasks comprise at least one of a read operand or a write operand.

3. The method of claim 1, wherein determining the dependency relationship among the multiple operation tasks according to the operands corresponding to the multiple operation tasks in the operation task queue further comprises:
   when a second operation task contains a read operation performed on a write operand of a first operation task, or the second operation task contains a write operation performed on an operand of the first operation task, determining that the second operation task depends on the first operation task;
   wherein the first operation task and the second operation task are different operation tasks in the operation task queue.

4. The method of claim 1, wherein determining the dependency relationship among the multiple operation tasks according to the operands corresponding to the multiple operation tasks in the operation task queue further comprises:
   when a second operation task contains a read operation performed on a read operand of a first operation task, determining that there is no dependency between the first operation task and the second operation task.

5. The method of claim 1, wherein scheduling the multiple operation tasks in the operation task queue based on the dependency relationship among the multiple operation tasks comprises:
  determining a scheduling order of the multiple operation tasks based on the dependency relationship among the multiple operation tasks;
  allocating memory for a current operation task in the operation task queue;
  scheduling, after allocation of the memory is completed, the current operation task to a context corresponding to the current operation task for execution; and
  allocating memory for a next operation task of the current operation task according to the scheduling order.

6. The method of claim 5, wherein determining the scheduling order of the multiple operation tasks based on the dependency relationship among the multiple operation tasks comprises at least one of:
  when there is no dependency between a first operation task and a second operation task in the multiple operation tasks, determining that the first operation task and the second operation task are scheduled in parallel; or,
  when the second operation task depends on the first operation task, determining that the second operation task is scheduled after the first operation task.

7. The method of claim 1, wherein the operands corresponding to the at least one merged communication operation task comprise at least one of:
  a set of read operands corresponding to the at least one communication operation task in the at least one merged communication operation task, or a set of write operands corresponding to the at least one communication operation task in the at least one merged communication operation task.

8. The method of claim 1, wherein the operation task queue comprises a first operation task queue and a second operation task queue,
  wherein the first operation task queue contains at least one communication operation task in the multiple operation tasks, and the second operation task queue contains the at least one non-communication operation task in the multiple operation tasks;
  wherein operation tasks in the first operation task queue and the second operation task queue are arranged in a scheduling order determined based on the dependency relationship among the multiple operation tasks.

9. The method of claim 8, further comprising:
  recording dependency information between the first operation task queue and the second operation task queue, wherein,
  when an operation task in the first operation task queue depends on at least one operation task in the second operation task queue, or when an operation task in the second operation task queue depends on at least one operation task in the first operation task queue, the dependency information comprises information of a last operation task of the at least one operation task; and
  wherein scheduling the multiple operation tasks in the operation task queue based on the dependency relationship among the multiple operation tasks comprises:
    scheduling the operation tasks in the first operation task queue and the second operation task queue based on the dependency information between the first operation task queue and the second operation task queue.

10. The method of claim 8, further comprising:
  setting a priority of a memory reclaim operation task to be the highest, wherein the second operation task queue comprises the at least one non-communication operation task except the memory reclaim operation task in the operation task queue.

11. The method of claim 1, wherein before determining the dependency relationship among the multiple operation tasks, further comprising:
  determining a context corresponding to each of the multiple operation tasks, wherein the context corresponding to each operation task comprises an abstract resource and an information stream; and
  wherein scheduling the multiple operation tasks in the operation task queue based on the dependency relationship among the multiple operation tasks comprises:
    scheduling the multiple operation tasks in the operation task queue based on the context corresponding to each of the multiple operation tasks and the dependency relationship among the multiple operation tasks.

12. The method of claim 11, wherein the information stream comprises at least one of a Compute Unified Device Architecture (CUDA) stream or a host stream.

13. The method of claim 11, wherein scheduling the multiple operation tasks in the operation task queue based on the context corresponding to each of the multiple operation tasks and the dependency relationship among the multiple operation tasks comprises:
  when there is no dependency between at least two operation tasks in the multiple operation tasks and the at least two operation tasks correspond to different abstract resources, scheduling the at least two operation tasks in parallel.

14. The method of claim 11, wherein scheduling the multiple operation tasks in the operation task queue based on the context corresponding to each of the multiple operation tasks and the dependency relationship among the multiple operation tasks comprises:
  when there is a dependency between a third operation task and a fourth operation task in the multiple operation tasks, and an information stream corresponding to the third operation task and an information stream corresponding to the fourth operation task are both a Compute Unified Device Architecture (CUDA) stream, synchronizing the third operation task and the fourth operation task by calling a first synchronous interface.

15. The method of claim 11, wherein scheduling the multiple operation tasks in the operation task queue based on the context corresponding to each of the multiple operation tasks and the dependency relationship among the multiple operation tasks comprises:
  when there is a dependency between a third operation task and a fourth operation task in the multiple operation tasks, and an information stream corresponding to at least one of the third operation task or the fourth operation task is a host stream, synchronizing the third operation task and the fourth operation task by calling a second synchronous interface.

16. A task scheduling device, comprising:
  a processor; and
  a memory configured to store instructions executable by the processor;
  wherein the processor is configured to:
    determine a dependency relationship among multiple operation tasks according to operands corresponding to the multiple operation tasks in an operation task queue; and schedule the multiple operation tasks in the operation task queue based on the dependency relationship among the multiple operation tasks, wherein the processor is further configured to:
  merge M communication operation tasks included in the multiple operation tasks to obtain at least one merged communication operation task, wherein each of the at least one merged communication operation task comprises at least one of the M communication operation tasks, M being an integer greater than or equal to 1; and
  determine the dependency relationship among the multiple operation tasks according to operands corresponding to the at least one merged communication operation task and operands corresponding to at least one non-communication operation task in the multiple operation tasks.

17. The device of claim 16, wherein the operands corresponding to the multiple operation tasks comprise at least one of a read operand or a write operand.

18. The device of claim 16, wherein the processor is further configured to:
  determine that a second operation task depends on a first operation task when the second operation task contains a read operation performed on a write operand of the first operation task, or the second operation task contains a write operation performed on an operand of the first operation task;
  wherein the first operation task and the second operation task are different operation tasks in the operation task queue.

19. The device of claim 16, wherein the operands corresponding to the at least one merged communication operation task comprise at least one of:
  a set of read operands corresponding to at least one communication operation task in the at least one merged communication operation task, or a set of write operands corresponding to the at least one communication operation task in the at least one merged communication operation task.

20. A non-transitory computer-readable storage medium, having stored therein computer programs, the computer programs being configured to execute the following:
  determining a dependency relationship among multiple operation tasks according to operands corresponding to the multiple operation tasks in an operation task queue; and
  scheduling the multiple operation tasks in the operation task queue based on the dependency relationship among the multiple operation tasks,
  wherein the operation of determining the dependency relationship among the multiple operation tasks according to the operands corresponding to the multiple operation tasks in the operation task queue comprises:
    merging M communication operation tasks included in the multiple operation tasks to obtain at least one merged communication operation task, wherein each of the at least one merged communication operation task comprises at least one of the M communication operation tasks, M being an integer greater than or equal to 1; and
    determining the dependency relationship among the multiple operation tasks according to operands corresponding to the at least one merged communication operation task and operands corresponding to at least one non-communication operation task in the multiple operation tasks.

* * * * *